(12) United States Patent
Boulesteix

(10) Patent No.: US 6,496,153 B2
(45) Date of Patent: Dec. 17, 2002

(54) DRIVER OF A MAGNETIC-FIELD SENDING ANTENNA WITH RLC CIRCUIT

(75) Inventor: Xavier Boulesteix, St Maur des Fosses (FR)

(73) Assignee: Valeo Electronique, Creteil (FR)

( * ) Notice: Subject to any disclaimer, the term of this patent is extended or adjusted under 35 U.S.C. 154(b) by 100 days.

(21) Appl. No.: 09/836,390

(22) Filed: Apr. 18, 2001

(65) Prior Publication Data

US 2002/0014859 A1 Feb. 7, 2002

(30) Foreign Application Priority Data

Apr. 19, 2000 (FR) .............................. 00 05044

(51) Int. Cl.[7] .............................. H01Q 1/32; G01V 3/00
(52) U.S. Cl. ........................................ 343/713; 324/322
(58) Field of Search .................................. 343/711, 712, 343/713, 714, 743, 744, 876; 324/318, 319, 322

(56) References Cited

U.S. PATENT DOCUMENTS

| | | | |
|---|---|---|---|
| 4,731,585 A | 3/1988 | Fox | 342/322 |
| 4,963,880 A | 10/1990 | Torre et al. | 343/866 |
| 5,289,199 A * | 2/1994 | Viereck | 343/745 |
| 5,373,301 A * | 12/1994 | Bowers et al. | 340/572.7 |
| 5,387,868 A * | 2/1995 | Rust et al. | 324/318 |
| 6,097,349 A * | 8/2000 | Sanford | 333/26 |
| 6,167,094 A * | 12/2000 | Reiner | 235/492 |
| 6,420,837 B2 * | 7/2002 | Boulesteix | 315/219 |

FOREIGN PATENT DOCUMENTS

| | | |
|---|---|---|
| EP | 0523271 | 1/1993 |
| EP | 0650216 | 4/1995 |

* cited by examiner

*Primary Examiner*—Don Wong
*Assistant Examiner*—Minh D A
(74) *Attorney, Agent, or Firm*—Liniak, Berenato & White

(57) ABSTRACT

The electronic circuit which is intended to feed a magnetic field sending coil has a first input terminal (1) for receiving a power-supply voltage (Uhat), a second input terminal (2) for receiving a periodic control signal (SC) within a predefined frequency range, an output terminal (4) for generating an output current (I) in sending coil (L) connected between the output terminal (4) and earth (M), in such a way as to convert the periodic control signal into a periodic magnetic field sent out by a coil. In this electronic circuit, a series RLC circuit (RLCI) is connected between the output terminal (4) and earth in order to form a tuned antenna with the sending coil (L). Such a configuration makes it possible to send out magnetic field according to an extended pattern so that a receiver unit has a better sensitivity.

5 Claims, 2 Drawing Sheets

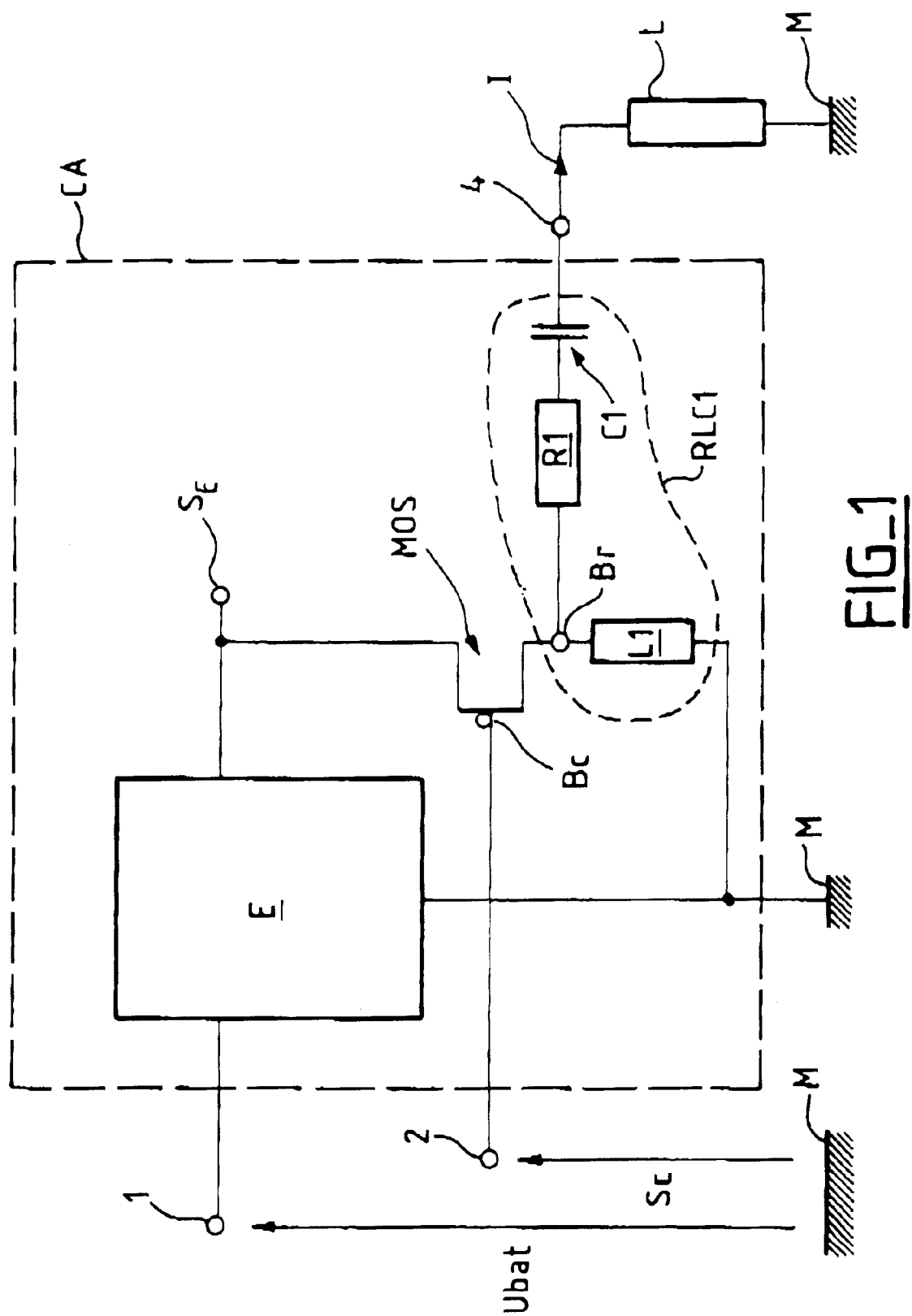
FIG_1

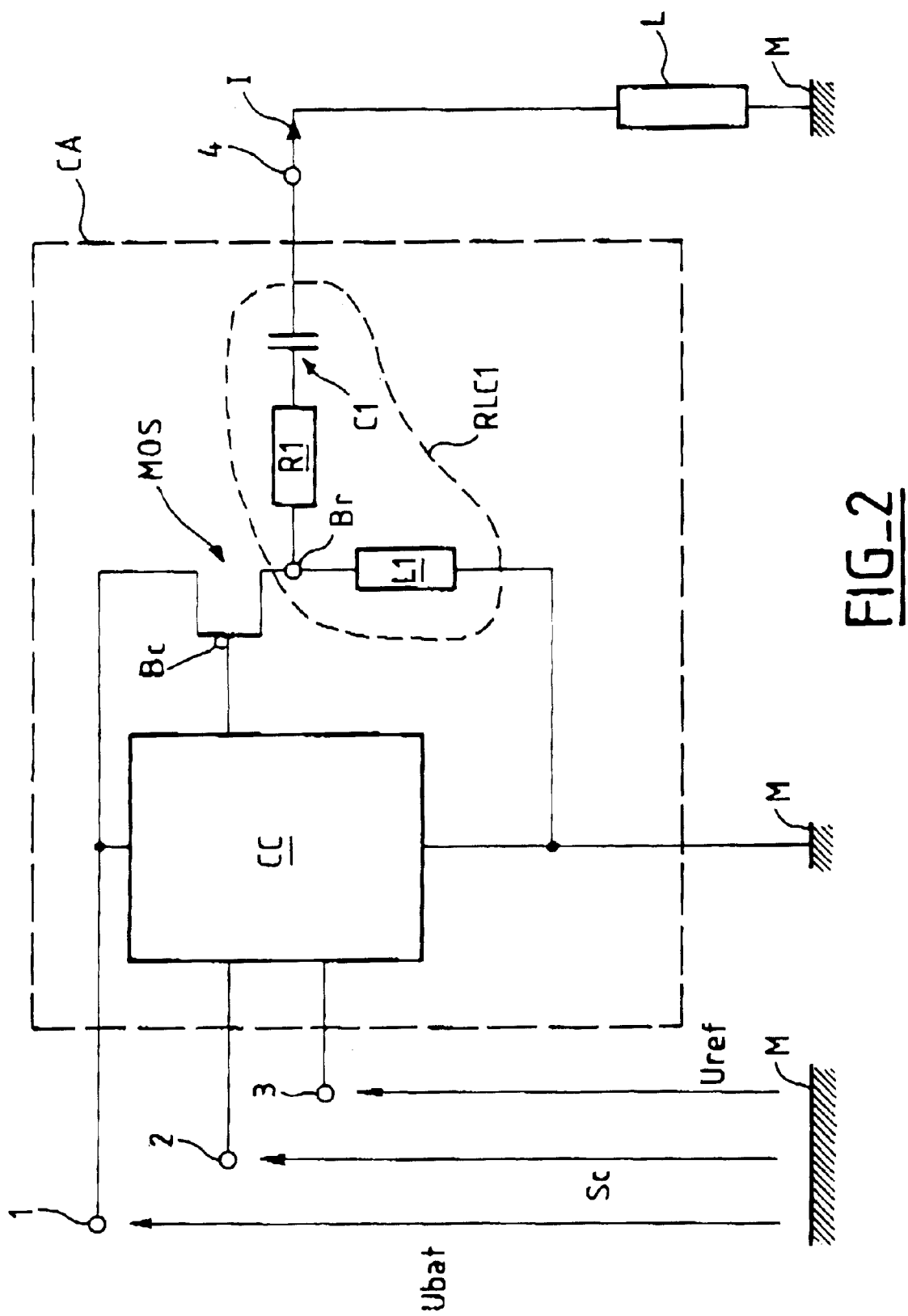
FIG_2

DRIVER OF A MAGNETIC-FIELD SENDING ANTENNA WITH RLC CIRCUIT

BACKGROUND OF THE INVENTION

The invention relates to an electronic circuit intended to feed a coil sending out a magnetic field, having a first input terminal for receiving a power-supply voltage, a second input terminal for receiving a periodic control signal in a predefined frequency range, an output terminal for generating an output current in the said sending coil connected between the said output terminal and earth, in such a way as to convert the said periodic control signal into a periodic magnetic field sent out by the coil.

Such a circuit is intended particularly to feed a magnetic-field sending coil serving as an antenna in a system, called "hands-free" system, for access to an enclosed space, this enclosure possibly being a motor vehicle, for example. Such a system may also allow or prevent a vehicle being started. Such a system generally includes a recognition device having a sending antenna in the form of a coil, which sends out a periodic magnetic field in order to carry on an exchange of data with an identification unit to be authenticated. Conventionally, the circuit for feeding the sending coil, which is powered by a battery of the vehicle, receives a control signal having a given frequency and converts this signal into a current which passes through the coil so that the latter sends out a magnetic field having the same frequency as the control signal.

In the prior art relating to "hands-free" access systems, it is generally observed that it is difficult to obtain high-quality data transmission between the recognition device and the identification unit. This is because the radiation pattern of a magnetic field in air is difficult to control, having regard particularly to the disturbances which the metal body-work of the vehicle introduces, which have an influence on the sending-antenna electrical characteristics, and having regard to the siting of the sending antenna which is subject to ergonomics imperatives.

One way of resolving this problem consists in optimizing the siting and the design of the sending coil so that the radiation pattern is satisfactory.

The defect in this solution is that it gives rise to increased costs for manufacturing the recognition device.

SUMMARY OF THE INVENTION

The object of the invention is to remedy this drawback by proposing a circuit for feeding the sending coil which enhances the quality of the data transmission.

To that end, the subject of the invention is an electronic circuit intended to feed a coil sending out a magnetic field, having a first input terminal for receiving a power-supply voltage, a second input terminal for receiving a periodic control signal in a predefined frequency range, an output terminal for generating an output current in the said sending coil connected between the said output terminal and earth, so as to convert the said periodic control signal into a periodic magnetic field sent out by the coil, characterized in that a series RLC circuit is connected between the said output terminal and earth so as to form a tuned antenna with the sending coil.

With such a construction, the magnetic field sent out is sinusoidal, and its range is increased, such that the sensitivity of a receiver as an identification unit is enhanced.

According to one preferred embodiment of the invention, in which the feed circuit comprises a volt-age-booster circuit, in order to use a magnetic-field sending antenna having a low quality factor or featuring electrical characteristics which are disturbed by the metal bodywork of the vehicle, a recognition device is obtained for which the overall cost of manufacture is reduced. Furthermore, in this embodiment, the voltage delivered by the voltage-booster circuit does not vary with fluctuations in the power-supply voltage supplied by a battery of the vehicle, such that the magnetic field sent out has a constant range. In this embodiment, the voltage delivered by the voltage-booster circuit may be set up in the course of a calibration operation.

According to another embodiment of the invention, in which the feed circuit comprises a control circuit, the peak intensity of a current which passes through the sending coil is constant and does not vary with fluctuations in the power-supply voltage supplied by the battery of the vehicle, such that the magnetic field sent out by the sending coil has a constant range.

According to yet another particular embodiment in which the feed circuit comprises a control circuit, it is then possible deliberately to alter the range of the magnetic field sent out by the sending coil so that the recognition device can, for example, better evaluate the position of an identification unit to be authenticated.

BRIEF DESCRIPTION OF THE DRAWINGS

The invention will now be described in further detail, and by reference to the attached drawings which illustrate one embodiment of it by way of non-limiting example.

FIG. 1 is a diagrammatic representation of a first embodiment of the electronic circuit according to the invention.

FIG. 2 is a diagrammatic representation of a second embodiment of the electronic circuit according to the invention.

DESCRIPTION OF THE PREFERRED EMBODIMENTS

FIG. 1 can be seen a feed circuit CA according to the invention, comprising, as input, a first input terminal 1 to which is applied a power-supply voltage Ubat which is, for example, a power-supply voltage supplied by a battery of the vehicle, a second input terminal 2 which is intended to receive a control signal SC, and, as output, an output terminal 4, this feed circuit CA being, moreover, connected to an electrical earth M which could, for example, be the earth of the vehicle. This circuit is intended to generate a current I in a magnetic-field sending coil L, this sending coil being connected, on the one hand, to the output terminal 4 and, on the other hand, to the earth M.

In this circuit, the input terminal 1 is connected to a voltage booster E, which supplies a stable DC voltage Ve, possibly equal to 40 volts, for example, between its output terminal Se and the earth M to which it is connected. The input terminal 2 is connected directly to the control terminal Bc of an MOS transistor so that the control signal SC drives this transistor, causing it to turn on and turn off. This MOS transistor is connected between the output terminal Se and a terminal Br of a circuit RLC1, in such a way that, when this MOS transistor is turned on, the voltage between the terminal Br and the earth M is equal to Ve. The circuit RLC1 is a series RLC circuit which is connected between the terminal 4 and the earth M, This circuit includes an inductive coil L1, a resistor R1 and a capacitor C1, the terminal Br being situated between the resistor R1 and the inductive coil L1.

In this circuit, the transistor, which is driven by the signal SC applies to the terminal Br a periodic voltage of the same period as the period of the signal SC and having Ve as its amplitude.

In a general way, the control signal SC is a square-wave periodic signal the frequency of which varies between 125 kHz and 133 kHz. Furthermore, the RLC circuit consisting of the circuit RLC1 and of the coil L is dimensioned so that its passband comprises the frequencies 125 kHz and 133 kHz, in such a way as to constitute a tuned antenna in this passbands. In this way, the periodic voltage which is applied to the terminal Br is converted into a periodic current I in the sending coil L which has a sinusoidal shape. Thus, the periodic signal SC is converted into a sinusoidal magnetic field having, as its period, the period of the signal SC, which is sent out by the coil L.

In the case of an un-tuned antenna, the magnetic signal sent out has the period of the control signal SC, but this magnetic signal has a triangular profile, so that a receiver, as a tuned identification unit, recovers only the fundamental sinusoidal component of this triangular signal. This results in low sensitivity of the identification unit as regards the magnetic signal.

In this circuit, the voltage booster E boosts the voltage applied to the tuned antenna to about 40 volts, which makes it possible to use a magnetic-field sending antenna the quality factor of which is lower or the electrical characteristics of which are disturbed by the environment, in order to reduce the cost of manufacturing the recognition device.

Furthermore, this voltage booster E may play the role of regulator in supplying a voltage of 40 volts, constant and fixed, independently of the fluctuations in the power-supply voltage Ubat which is delivered by the battery, so that the magnetic signal is sent out according to a radiation pattern with constant range. In fact, it is usual for a vehicle battery of the 12 volts type to have its voltage fluctuating between 10 and 16 volts, and it is obviously inconvenient for these fluctuations to have repercussions on the range of the sending of the magnetic field.

Finally, in the case of the use of a tuned antenna having a low quality factor, and hence in the case of inexpensive electronic components which exhibit high dispersions in their technical characteristics (resistance, capacitance and inductance values), the voltage-booster circuit E can be calibrated so that the magnetic-field radiation pattern does not fluctuate from one feed circuit to another. This calibration may consist, for example, in measuring the rms voltage between the output terminal 4 and the earth M, then in setting up the output voltage Ve in order to obtain a certain desired rms voltage between the output terminal 4 and the earth M.

In FIG. 2 can be seen a feed circuit CA according to the invention comprising, as input, a first input terminal 1 to which is applied a power-supply voltage Ubat which is, for example, a power-supply voltage supplied by a battery of the vehicle, a second input terminal 2 which is intended to receive a control signal SC, a third input terminal 3 intended to receive a reference voltage Uref, and, as output, an output terminal 4, this feed circuit CA furthermore being connected to an electrical earth M which may, for example, be the earth of the vehicle. This circuit is intended to generate a current I in a magnetic-field sending coil L, this sending coil being connected, on the one hand, to the output terminal 4 and, on the other hand, to the earth M.

This feed circuit comprises the control circuit CC to which is connected each input terminal 1, 2, 3, and which generates a control signal in order to drive the on or off state of an MOS transistor by way of a control terminal Bc of the MOS transistor to which this control circuit CC is connected. In this circuit, the MOS transistor is connected between the input terminal 1 and the terminal Br of a circuit RLC1, thus, when this MOS transistor is turned on, the voltage between Br and the earth M is equal to Ubat. The circuit RLC1 is a series RLC circuit which is connected between the terminal 4 and the earth M. This circuit includes an inductive coil L1, a resistor R1 and a capacitor C1, the terminal Br being situated between the resistor R1 and the inductive coil L1.

In the same way as for the first feed circuit, here there is a circuit which applies to the terminal Br of the tuned antenna a periodic voltage of the same period as the period of the control signal SC, in order to generate a sinusoidal current in the tuned antenna, within a passband situated, for example, between 125 and 133 kHz. Here, the voltage applied to the terminal Br has as its amplitude the power-supply voltage Ubat supplied by the battery. Hence, the periodic signal SC is converted into a sinusoidal magnetic field having as its period the period of the signal SC, which is sent out by the coil L, such a field exhibiting the advantages which were explained for the first feed circuit.

In the circuit, the MOS transistor is not directly driven by the signal SC, but by a signal having the same period as the signal SC, and having a duty cycle r which depends on the power-supply voltage Ubat and on the reference voltage Uref. With such a configuration, the rms value of the voltage which is applied to the terminal Br of the tuned antenna varies with the duty cycle r. Hence, the control circuit CC alters the value of the peak intensity of the current I which passes through the sending coil L by altering the duty cycle r, in order to vary the range of the magnetic field which is sent out by this coil.

More particularly, the MOS transistor is turned on for a period $\Delta$ton and turned off for a period $\Delta$toff, and the duty cycle r which is equal to r=$\Delta$ton/($\Delta$ton+$\Delta$toff) complies with the condition $\Delta$ton+$\Delta$toff=p.

In one preferred embodiment of the feed circuit according to the invention, the duty cycle r increases when Ubat reduces, and reduces when Ubat increases. Hence, the value of the peak current I in the coil L is constant independently of the fluctuations in the power-supply voltage Ubat supplied by the battery of the vehicle, so that the radiation pattern of the magnetic field has a constant range independently of the fluctuations in the power-supply voltage Ubat.

In another preferred embodiment of the feed circuit according to the invention, the duty cycle r increases when the voltage Uref increases and reduces when it reduces. In this way, the peak value of the current I in the coil L depends on the value of the voltage Uref which is applied, which makes it possible deliberately to alter the range of the radiation pattern of the magnetic field. Such an application may be very useful in order to perform transmission known as "double power" transmission in which the recognition device is capable of sending according to two radiation patterns of different size, in order to locate the physical position of a recognition unit to be authenticated.

What is claimed is:

1. An electronic circuit intended to feed a coil sending out a magnetic field, having a first input terminal (1) for receiving a power-supply voltage (Ubat), a second input terminal (2) for receiving a periodic control signal (SC) in a predefined frequency range, an output terminal (4) for generating an output current (I) in a sending coil (L) connected between the said output terminal (4) and earth (M), so as to convert the said periodic control signal into a periodic magnetic field sent out by the coil, wherein a series RLC circuit (RLC1) traversed by the output current is connected between the said output terminal (4) and earth so as to form a tuned antenna with the sending coil (L).

2. The electronic circuit as claimed in claim 1, comprising a voltage-booster circuit (E) and a transistor (MOS), the said voltage-booster circuit receiving the said power-supply voltage (Ubat) and delivering a boosted voltage, the said boosted voltage being applied to a terminal (Br) of the RLC circuit (RLC1) by way of a transistor (MOS), the said transistor being driven by the control signal (SC), so that the output current (I) flowing in the coil (L) has a peak intensity corresponding to a reference peak intensity.

3. The electronic circuit as claimed in claim 1, comprising a control circuit (CC) and the transistor (MOS), the said control circuit (CC) receiving the power-supply voltage (Ubat) and the control signal (SC) in order to drive the on or off state of the said transistor (MOS) by applying to this transistor a periodic voltage having a period identical to the period of the control signal (SC) and a duty cycle which depends on the power-supply voltage, the said transistor (MOS) being connected between the input terminal (1) and a terminal (Br) of the RLC circuit (RLC1), so that the current (I) flowing in the coil (L) has a peak intensity corresponding to a reference peak intensity.

4. The electronic circuit as claimed in claim 3, wherein the reference peak intensity is adjustable in order deliberately to alter the range of the magnetic field sent out by the sending coil (L).

5. A system, called hands-free system, intended to control the unlocking of openable parts of a vehicle and/or to allow the starting of a vehicle, comprising an electronic circuit as claimed in claim 1, wherein the power-supply voltage (Ubat) is supplied by a battery of the vehicle.

* * * * *